United States Patent [19]

Sakagaito et al.

[11] Patent Number: 4,691,998
[45] Date of Patent: Sep. 8, 1987

[54] POLYGON MIRROR CONSTRUCTION

[75] Inventors: Yukuo Sakagaito, Yokohama; Katsutoshi Yonemochi, Zama; Koichi Kawata, Tama; Takeshi Masaki, Kawasaki, all of Japan

[73] Assignee: Matsushita Electric Industrial Co., Ltd., Kadoma, Japan

[21] Appl. No.: 841,020

[22] Filed: Mar. 17, 1986

Related U.S. Application Data

[63] Continuation of Ser. No. 647,848, Sep. 6, 1984, abandoned.

[30] Foreign Application Priority Data

Sep. 9, 1983 [JP] Japan ................................. 58-166968
Apr. 13, 1984 [JP] Japan ................................. 59-74087
Apr. 13, 1984 [JP] Japan ................................. 59-74088
Apr. 13, 1984 [JP] Japan ................................. 59-74089

[51] Int. Cl.$^4$ .......................... G02B 5/08; G02B 5/10
[52] U.S. Cl. .................................... 350/616; 350/588; 350/631
[58] Field of Search ................. 350/6.7, 6.8, 616, 636, 350/588, 631

[56] References Cited

U.S. PATENT DOCUMENTS 2,537,900  1/1951  Lee et al. ........................... 350/253
3,529,884  9/1970  Ives et al. ........................... 350/6.8
3,622,221  6/1969  Kossyk ............................... 350/6.8
3,772,464  11/1973 Chan et al. .......................... 350/616
4,030,047  6/1977  Fletcher et al. ..................... 350/253
4,512,626  4/1985  Kamiya et al. ....................... 350/6.8
4,523,800  6/1985  Yamashita et al. .................. 350/6.7

FOREIGN PATENT DOCUMENTS 0029004  2/1982  Japan ................................... 350/6.7

OTHER PUBLICATIONS

Xerox Disclosure Journal, *Adjustable Rotating Light Beam Deflector,* by Milton J. Profant, vol. 6, No. 2, Mar./Apr. 1981.

Primary Examiner—John K. Corbin
Assistant Examiner—Vincent J. Lemmo
Attorney, Agent, or Firm—Cushman, Darby & Cushman

[57] ABSTRACT

In a polygon mirror construction comprising a polygon mirror with a hole formed at the central position for passing through a shaft of a motor and a supporting means fixed to the shaft of the motor for supporting the polygon mirror, and a space, a groove or a heat insulating plate is formed between the polygon mirror and the supporting means, thereby a heat rise of the polygon mirror is prevented and high accuracy of the polygon mirror construction is assured.

12 Claims, 13 Drawing Figures

POLYGON MIRROR CONSTRUCTION

This is a continuation of application Ser. No. 647,848, filed Sept. 6, 1984, which was abandoned upon the filing hereof.

BACKGROUND OF THE INVENTION

1. Field of the Invention

The present invention relates an improvement in an assembly or construction of a polygon mirror for use, for example, in a laser scanner for reading a manuscript, in a laser printer, or in laser scanning apparatuses for measuring or examining.

2. Description of the Prior Art

A polygon mirror is such a mirror that is produced by making the side surfaces of a rotation body of polygon prism shape into mirror faces. A laser scanning is executed by rotating the polygon mirror by making a laser light to be reflected on the mirror surfaces.

The polygon mirror is required to have highly accurate dimensions and a high reflection coefficient, since the polygon mirror largely influences the quality of image output of the laser printer, etc. For satisfying such demand, generally the polygon mirror is produced by precisely polishing a glass surface and by evaporating a metal, for example, aluminum, on the polished glass surface. Alternatively, the polygon mirror is produced by processing a metal body of, for example, copper or aluminum material, utilizing a diamond member. The required accuracy is such that an allowable error an an inclination angle of the reflection surface of the polygon mirror against a reference face is ±5″, a flatness of the reflection surface is 0.08 $\mu$m and a roughness of the reflection surface is 0.01 to 0.02 $\mu$m Ra.

Such high a precision polygon mirror is mounted on a shaft of a motor and is rotated by the motor. Therefore, the mounting mechanism of the polygon mirror, that is, the polygon mirror construction also should have high accuracy.

FIG. 12 shows a conventional polygon mirror construction. Two flanges or washers 32, 32 are fixed on an upper surface and on an lower surface of the polygon mirror 31 by an adhesive. The two flanges 32, 32 are held between a stopper 7 and a nut 5 which are mounted to the shaft 3 of the motor 2 with pressing the flanges 32, 32.

The polygon mirror 31 is rotated at 2000 to 3000 r.p.m., therefore the temperature of the motor 2 rises 60° C. or higher. The raised temperature is transmitted to the flanges 32, 32, the stopper 7 and the nut 5, and further to the polygon mirror 31 via the shaft 3, thereby inducing the following problems.

(1) The dimension accuracy of the flanges 32, 32 is lost on account of heat expansion.

(2) The polygon mirror 31 is deformed or is destroyed by forced stress since the expansion coefficient of the polygon mirror 31 and the flange 32 are largely different and the polygon mirror 31 and the flanges are tightly fixed to each other by the adhesive.

(3) The accuracy of the polygon mirror construction is lowered by the heat expansion of the adhesive itself.

(4) The polygon mirror 31 is deformed on account of the heat.

As a result of the above, the reflection angle of the laser beam on the reflection surfaces of the polygon mirror 31 varies on account of the many problems and the image output quality of the laser printer decreases.

SUMMARY OF THE INVENTION

Therefore, a purpose of the present invention is to provide an improved polygon mirror construction having high reliability and high accuracy, manufactured with low cost, by preventing the above-mentioned heat influence.

A polygon mirror construction in accordance with the present invention comprises:

a polygon mirror having a hole at a central part for passing a shaft of a motor therethrough, a pair of supporting means fixed to the shaft of the motor, for supporting upper and lower surfaces of the polygon mirror, with a space formed between the polygon mirror and the supporting means.

Another polygon mirror construction in accordance with the present invention comprises:

a polygon mirror having a hole at a central part for passing a shaft of a motor therethrough, a pair of flanges fixed to the shaft of the motor, for supporting therebetween upper and lower surfaces of the polygon mirror, at least one of the flanges having at least a groove on the face thereof opposing the corresponding mirror surface, and at least an adhesive layer filling the groove and bonding the flange to the polygon mirror therewith.

Another polygon mirror construction in accordance with the present invention comprises:

a polygon mirror having a hole at a central part for passing a shaft of a motor therethrough, flanges fixed to the shaft of the motor, for supporting upper and lower surfaces of the polygon mirror, with the thermal expansion coefficient of one of the flanges not exceeding $20 \times 10^{-7}/°$ C., a heat insulating plate having a heat conductivity of 0.005 Cal/sec·cm·° C., being held between the one flange and the polygon mirror.

DESCRIPTION OF THE PREFERRED EMBODIMENTS

Figure 1:
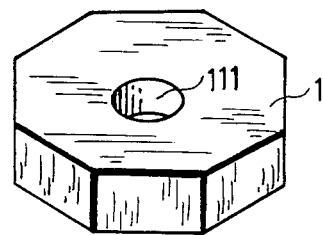
FIG. 1 is a perspective view of a polygon mirror.
Figure 2:
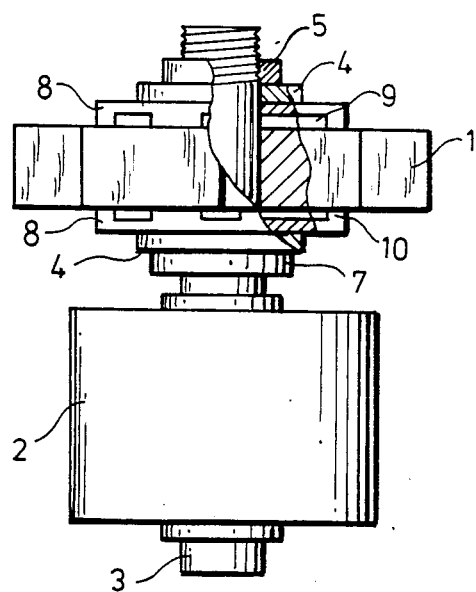
FIG. 2 is a partially broken away front view of an embodiment of the polygon mirror construction of the present invention.

A first preferred embodiment of the present invention is shown in FIG. 2. A polygon mirror 1 shown in FIG. 1 is used in the embodiment in FIG. 2. The polygon mirror 1 is an octagonal face mirror of a regular octagonal prism and has a central through hole 111 for passing the shaft 3 of the motor 2 through the mirror. In the embodiment of FIG. 2, a polygon mirror 1 is not held directly between flanges or washers 4, 4 but is held via circular spacers 8, 8 between flanges 4, 4.

Figure 3:
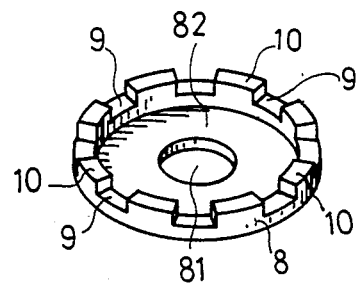
FIG. 3 is a perspective view of a spacer of the polygon mirror construction of the embodiment in FIG. 2.

The flanges 4, 4 and the spacers 8, 8 form a supporting means for the polygon mirror 1 in the embodiment. That is, the flanges 4, 4 hold the upper surface and lower surface of the polygon mirror 1 via the spacers 8, 8 and the flanges 4, 4 are held between the stopper 7 and nut 5 which are mounted to the shaft 3 of the motor 2 with pressing the flanges 4, 4. The spacer 8 is shown in FIG. 3. A through hole 81 is bored coaxially through the spacer 8 for passing through the shaft 3 of the motor 2 and a large circular recess 82 is formed at the central part of the spacer 8 facing the mirror 1 and several small recesses 9, 9, 9, ... are formed at peripheral parts of the spacer 8. In other words the spacer has a peripheral flange facing the mirror to form the space 82 and the flange is notched at 9 to provide protrusions 10. Therefore, the spacer 8 contacts the polygon mirror 1 only at the protrusions 10, 10, ... formed at the peripheral part of the spacer 8. Accordingly, the transmission of the heat produced by the motor 2 to the polygon mirror 1 from the flanges 4, 4 is small since the heat transmission part from the spacer 8 to the polygon mirror 1 is only the protrusions 10, 10, .... Further, the spacer 8 and the polygon mirror 1 are cooled by air flowing in and out through the large recess 82 and the small recesses 9, 9, ... of the spacer 8. Accordingly, the temperature rise and thermal deformation of the polygon mirror decreases extremely.

Under such conditions that glass material of heat expansion coefficient ($7.4 \times 10^{-6}$/° C.) is used for the polygon mirror 1, ceramic material of heat expansion coefficient ($9.4 \times 10^{-6}$/° C.) is used for the spacer 8, the outer peripheral diameter of the octagonal prism of the polygon mirror 1 is 174 mm and the range of the temperature of the shaft 3 of the motor 2 is $-10°$ C. to $35°$ C., the variation of the inclination angle of the reflection surface of the polygon mirror 1 against the shaft 3 is within $\pm 3''$. Thus, the above-mentioned embodiment of the present invention has a high reflection accuracy.

Figure 4A:
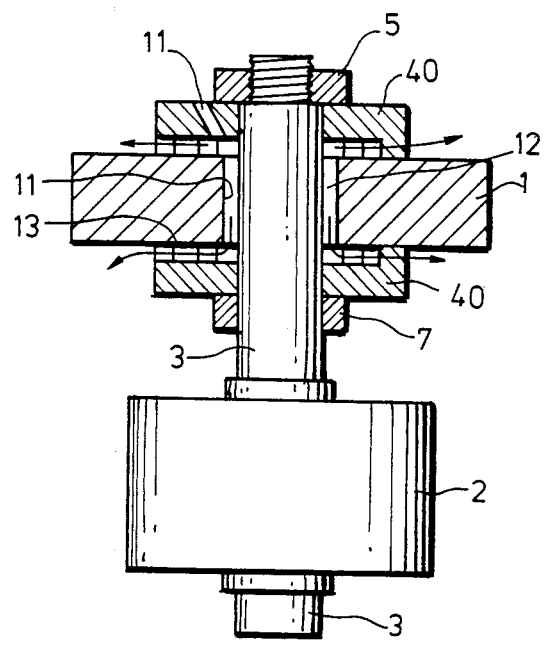
FIG. 4(a) is a sectional view of another embodiment of the polygon mirror construction of the present invention.
Figure 4B:
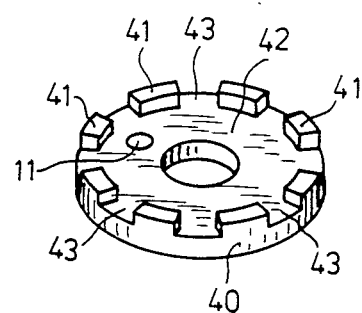
FIG. 4(b) is a perspective view of a flange of the polygon mirror construction of the embodiment in FIG. 4(a).

The second embodiment of the polygon mirror construction of the present invention is shown in FIG. 4(a) and FIG. 4(b). The circular flange or washers 40 itself has a large recess 42 at its central part 40 and small recesses 43, 43, ... at its peripheral part like the large recess 82 and the small recesses 9, 9, 9, ... of the spacer 8 shown in FIG. 3. Therefore, the flanges 40 contacts with the upper surface and lower surface of the polygon mirror 1 only at the protrusions 41, 41, 41 .... Further, a through hole 11 is bored through the flange 40 spaced from its central hole. Both flanges 40, 40 may have the hole 11. When the hole 11 is formed in only one flange 40, it is preferably to have a considerably gap 12 between the shaft 3 and the inner surface of the central hole of the polygon mirror 1. In the embodiment shown in FIG. 4(a), on the rotation of the polygon mirror 1, air flows into the recess 42 through the hole 11, through the gap 12, as indicated by arrows, and out through and the small recesses 43, 43, ... along the end faces 13 of the polygon mirror 1. Accordingly, the flange 40 and the polygon mirror 1 are cooled by the flowing air, thereby the temperature increment is prevented.

Figure 5:
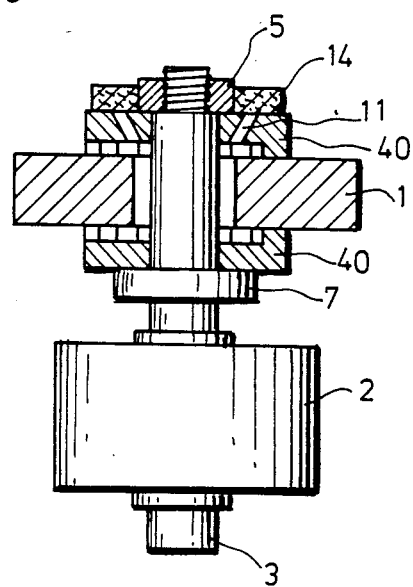
FIG. 5 is a sectional view of another embodiment of the polygon mirror construction of the present invention.

The third embodiment of the polygon mirror construction of the present invention is shown in FIG. 5. A filter 14 is attached covering the hole 11 on the outer surface of the flange 40. The filter 14 can filtrate the flow-in air, thereby clean air is supplied into the polygon mirror construction. Therefore, even though the polygon mirror construction is used for a long time, dust does not accumulate in the large recess 42 nor attach to the reflection surface of the polygon mirror 1, thereby the decrease of the reflection rate can be prevented.

Figure 6:
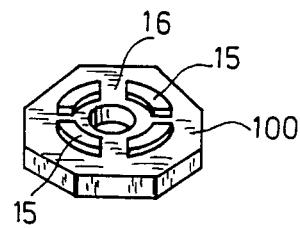
FIG. 6 is a perspective view of another embodiment of the polygon mirror construction of the present invention.

The fourth embodiment of the polygon mirror construction of the present invention is shown in FIG. 6. The polygon mirror 100 used in the fourth embodiment has spaced protrusions 15, 15, ... on its end surface. Other members of the polygon mirror construction are same as the conventional polygon mirror construction. The polygon mirror 100 contacts with the flange 4 only at the protrusions 15, 15, ..., therefore the flange 4 and the polygon mirror 100 are cooled by an air which flow through gaps 16 between the protrusions.

Further, when the thermal expansion coefficient of the spacer 8 of the first embodiment in FIG. 2 or the flange 40 of the second or third embodiments in FIG. 4(a) and FIG. 5 is equal or very close (it is preferable that the difference is within 20%) to the thermal expansion coefficient of the polygon mirror 1, the polygon mirror 1 is not deformed in spite of the heat expansions of the flange 4, 40, the spacer 8 or the polygon mirror 1. Therefore, in such embodiments the polygon mirror construction can show high accurate scanning in a wide range of temperature.

In the above-mentioned embodiments, an adhesive can be filled up into a part of the recessed 9, 43 or the gaps 16, thereby a large slippage between the polygon mirror 1, 100 and the flange 4, 40 or spacer 8 can be prevented and the destruction of the polygon mirror 1 is prevented.

Figure 7:
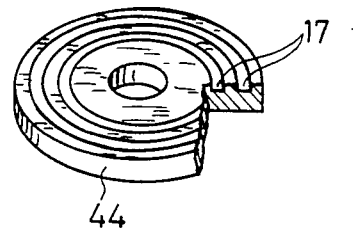
FIG. 7 is a partly cut away perspective view of a flange of another embodiment of the polygon mirror construction of the present invention.
Figure 8:
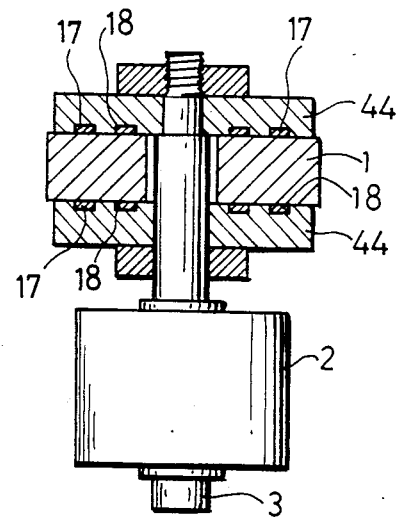
FIG. 8 is a sectional view of a polygon mirror construction of the present invention using the flange shown in FIG. 7.

The fifth embodiment of the polygon mirror construction of the present invention is shown in FIG. 7 and FIG. 8. A flange 44 shown in FIG. 7 has some concentric circular grooves 17, 17, .... In the polygon mirror construction of FIG. 8 using the flange 44, the grooves 17, 17, ... are filled up with an elastic adhesive 18, 18, ..., for example, silicone rubber adhesive. The adhesive 18, 18, ... fixes the flange 44 to the polygon mirror 1. Further, a solid state lubricant, for example, powder of $MoS_2$ is coated on the part of the flange surface which is contacting with the polygon mirror 1. The existence of the grooves 17, 17, ... can inhibit the transmission of the heat from the flanges 44, 44 to the polygon mirror 1. Further the embodiment has the following advantages.

(1) The adhesive 18, 18, ... in the grooves 17, 17, ... can prevent a large amount of slippage between the flange 4 and the polygon mirror 1, thereby a destruction of the polygon mirror can be prevented.

(2) The flange 44 is fixed directly to the polygon mirror 1, therefore the assembly accuracy of the polygon mirror construction is superior to the assembly accuracy of the conventional polygon mirror construction, in which the flanges 32 are attached to the polygon mirror 31 via wide adhesive layers that are liable to transform.

(3) The solid state lubricant is coated on the flange surface contacted with the polygon mirror 1 and the adhesive 18 is elastic, therefore even though the heat expansion coefficients of the polygon mirror 1 and flange 33 are much different, small displacement between the flange 44 and the polygon mirror 1 is possible, thereby forcible stress is not induced on the polygon mirror 1. Accordingly high accuracy of reflection is ensured. This embodiment of the polygon mirror construction can have recesses for cooling as mentioned in FIG. 4(a).

Figure 9:
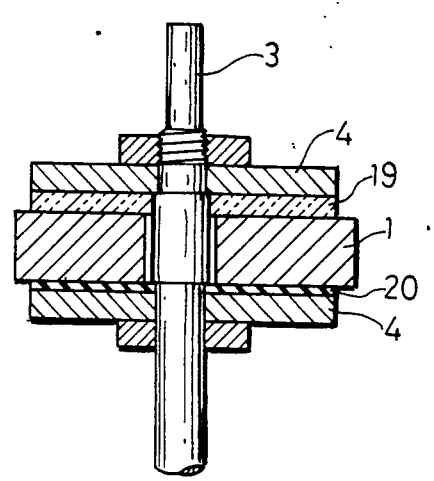
FIG. 9 is a sectional view of another embodiment of the polygon mirror construction of the present invention.

A sixth embodiment of the polygon mirror construction of the present invention is shown in FIG. 9. A heat insulating plate 19 is held between the polygon mirror 1 and one flange 4. The heat insulating plate 19 is bonded to the polygon mirror 1. The thermal conductivity of the heat insulating plate 19 which is made of glass ceramic complex material, for example, "Macor" (Corning Glass Works' make) is 0.004 Cal/sec.cm$^{2\circ}$ C. which is about $\frac{1}{8}$ of that of general metal. A rubber plate 20 is held between the polygon mirror 1 and the other flange 4. A heat insulating plate can be used in place of the rubber plate 20. The flange 4 contacted with the heat insulating plate 19 is made of Invar which is an alloy having a heat expansion coefficient not exceeding $20 \times 10^{-7\circ}$ C. The heat insulating plate 19 is fixed to the flange 4 by adhesive. The embodiment of the polygon mirror construction in FIG. 9 has the following advantages against the motor heat.

(1) The flange 4 having low heat expansion coefficient is not deformed.

(2) The shape and size accuracy of the polygon mirror 1 is high since the heat insulating plate 19 and the rubber 20 inhibit the heat transmission.

(3) Even though the heat expansion coefficients of the polygon mirror 1 and the flange 4 are very different, the heat insulating plate 19 absorbs the small slip between the polygon mirror 1 and the flange 4, therefore forcible stress is not induced in the polygon mirror 1.

Figure 10:
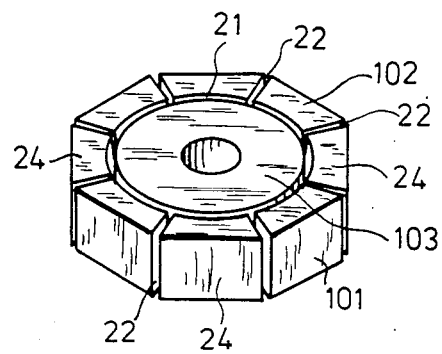
FIG. 10 is a perspective view of a polygon mirror of another embodiment of the polygon mirror construction of the present invention.
Figure 11:
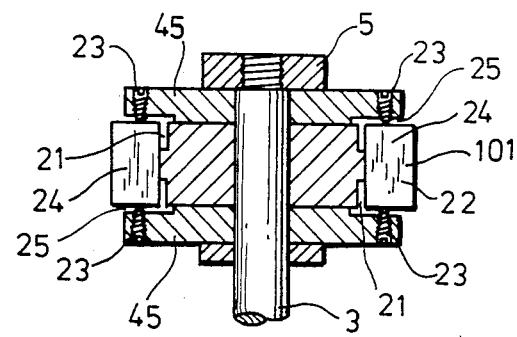
FIG. 11 is a sectional view of a polygon mirror construction of the present invention using the polygon mirror shown in FIG. 10.
Figure 12:
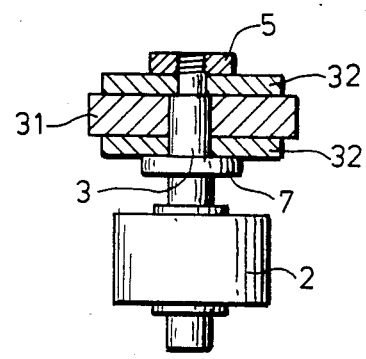
FIG. 12 is the sectional view of a conventional polygon mirror construction.

The seventh embodiment of the polygon mirror construction of the present invention is shown in FIG. 10 and FIG. 11. The feature of the embodiment is in polygon mirror 101 shown in FIG. 10. The polygon mirror 101 is made of aluminum and has several slits. That is, as apparent in FIG. 10 and FIG. 11, circular slits 21, 21 are deeply formed in the upper surface and the lower surface of said polygon mirror 101 in a manner that the circular slits 21, 21 part a mirror peripheral part 102 from a core part 103 of the ploygon mirror 101. Radial slits 22, 22, 22, ... are deeply formed from each boundary line of the neighboring reflection surfaces to the circular slits 21, 21. In FIG. 11, screws 23, 23, 23, ... art set in to the flanges 45, 45, the screws 23 being provided for respective blocks 24 of the polygon mirror 101 defined by the slits 21, 21, 22, 22. The tips of the screws 23 touch the faces of the blocks 24 as shown in FIG. 11. The slits 21, 22 of the polygon mirror 101 can make the air flow in itself according to the rotation of the polygon mirror 101. Therefore, the polygon mirror 101 is cooled. Further, the inclination of the reflection surface of the each block 24 can be controlled individually by the positioning of the screws 23, 23, .... That is, the block 24 is bent upward or downward by the press force of the screw 23. The space 25 between the flange 45 and the block 24 serves as space for allowing the bending of the block 24. Thus the inclination of the reflection surface of the polygon mirror 101 can be controlled individually for each block 24, thereby the polygon mirror construction having high accuracy can be obtained at a low price and high quality image output of the laser printer can be obtained. Incidentally the shape of the slit 21 is not necessarily ring type but can be a polygon shape type, etc. The means for bending the block 24 is not necessarily the screw but can be other bending means.

What is claimed is:

1. A polygon mirror assembly comprising:
   a polygon mirror of unitary construction having a central hole for a motor shaft;
   a motor shaft extending through said hole;
   an abutment on said shaft;
   a nut threaded onto one end of said shaft spaced from and facing said abutment for receiving said mirror therebetween;
   a pair of spacers, one between said nut and said mirror and the other between said abutment and said mirror;
   means defining recesses in one of the opposed abutting surfaces of said spacers and said mirror for limiting the transmission of heat from said motor through said shaft, nut, abutment and spacers to said mirror said recesses being defined by a circular array of protrusions, with gaps therebetween, for flow of air through said gaps, and said array defining a central recess; and
   means defining a hole extending through at least one of said spacers from end to end thereof for admitting air therethrough to said central recess.

2. The assembly defined in claim 1 wherein the thermal expansion coefficient of the spacers is substantially the same as that of the mirror.

3. The assembly defined in claim 1 wherein the diameter of the central hole is greater than that of the shaft portion extending therethrough for flow of air through the resulting annular gap between said mirror and shaft portion.

4. The assembly defined in claim 1 including an air filter covering the entrance end of the air admission hole.

5. The assembly defined in claim 1 wherein the recesses are in the mirror.

6. The assembly defined in claim 1 wherein the recesses are in the spacers.

7. The assembly defined in claim 6 including elastic adhesive filling at least a part of the recesses to bond the spacer to the mirror.

8. The assembly defined in claim 7 including a solid state lubricant coated on at least one of the opposed abutting surfaces of the spacers and the mirror.

9. The assembly defined in claim 1 including in the opposite ends of said mirror coaxial circular slits of equal diameter and radial slits extending inward from each boundary line between adjacent reflection surfaces to said circular slits to define a mirror core part and blocks; and
   screw means extending through the spacers and contacting each of said blocks to adjustably bend the latter longitudinally of said assembly to adjust the deflection angle of said reflection surfaces.

10. The assembly defined in claim 9 in which the spacers are relieved adjacent their peripheries to form an annular gap between each spacer and the blocks to inhibit transmission of heat therebetween.

11. A polygon mirror assembly comprising:
a polygon mirror of unitary construction having a central hole for a motor shaft;
a motor shaft extending through said hole;
an abutment on said shaft;
a nut threaded onto one end of said shaft spaced from and facing said abutment for receiving said mirror therebetween; and
a pair of crown wheel shaped spacers respectively having a central hole, a large recess formed around said central hole and plural small recesses defined by a circular array of protrusions with gaps therebetween for flow of air through said gaps, one spacer being between said nut and said mirror and the other spacer being between said abutment and said mirror.

12. A polygon mirror assembly comprising:
a polygon mirror of unitary construction having a central hole for a motor shaft;
a motor shaft extending through said hole;
an abutment on said shaft;
a nut threaded onto one end of said shaft spaced from and facing said abutment for receiving said mirror therebetween;
a pair of spacers respectively having a central hole for said motor shaft and at least one recess for flow of air therethrough, and at least one of said spacers having at least one through hole for flow of air from or to said recess, one of said spacers being between said nut and said mirror and the other of said spacers being between said abutment and said mirror.

* * * * *